(12) United States Patent
Masuko et al.

(10) Patent No.: US 11,962,191 B2
(45) Date of Patent: Apr. 16, 2024

(54) ROTOR, ELECTRIC MOTOR, COMPRESSOR, AND AIR CONDITIONER

(71) Applicant: Mitsubishi Electric Corporation, Tokyo (JP)

(72) Inventors: Tomoki Masuko, Tokyo (JP); Atsushi Matsuoka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 339 days.

(21) Appl. No.: 17/613,779

(22) PCT Filed: Jun. 26, 2019

(86) PCT No.: PCT/JP2019/025334
§ 371 (c)(1),
(2) Date: Nov. 23, 2021

(87) PCT Pub. No.: WO2020/261418
PCT Pub. Date: Dec. 30, 2020

(65) Prior Publication Data
US 2022/0231554 A1    Jul. 21, 2022

(51) Int. Cl.
*H02K 1/276*    (2022.01)
*F25B 31/02*    (2006.01)
(Continued)

(52) U.S. Cl.
CPC ........... *H02K 1/2766* (2013.01); *F25B 31/02* (2013.01); *H02K 21/14* (2013.01); *F24F 5/00* (2013.01); *H02K 2213/03* (2013.01)

(58) Field of Classification Search
CPC .............................. H02K 1/276; H02K 1/2766
See application file for complete search history.

(56) References Cited

U.S. PATENT DOCUMENTS

2014/0210294 A1    7/2014  Wakita
2014/0217859 A1    8/2014  Saito et al.
(Continued)

FOREIGN PATENT DOCUMENTS

DE    10 2017 003 606 A1    10/2017
EP       2 602 911 B1      9/2018
(Continued)

OTHER PUBLICATIONS

Office Action dated May 19, 2022 in connection with counterpart Indian Patent Application No. 202127055393 (and English translation).

(Continued)

*Primary Examiner* — Gary A Nash
(74) *Attorney, Agent, or Firm* — POSZ LAW GROUP, PLC

(57) ABSTRACT

A rotor includes a rotor core, a first permanent magnet that is W1 mm long in a longitudinal direction, and a second permanent magnet that is W1 mm long in a longitudinal direction. The rotor core includes a first magnet insertion hole, a second magnet insertion hole, and a center lib. The first magnet insertion hole includes a first outside opening part having a radius of curvature of R1 mm, and a first inside opening part having a radius of curvature of R2 mm. The second magnet insertion hole includes a second outside opening part having a radius of curvature of R1 mm, and a second inside opening part having a radius of curvature of R2 mm. The rotor satisfies R1>R2 and 0<(R1+R2)/W1<0.082.

9 Claims, 8 Drawing Sheets

(51) Int. Cl.
*H02K 21/14* (2006.01)
*F24F 5/00* (2006.01)

(56) References Cited

U.S. PATENT DOCUMENTS

| | | | | |
|---|---|---|---|---|
| 2015/0256038 | A1* | 9/2015 | Nigo | F25B 31/026 |
| | | | | 310/156.57 |
| 2015/0372548 | A1* | 12/2015 | Nigo | H02K 21/12 |
| | | | | 310/156.01 |
| 2017/0070112 | A1* | 3/2017 | Ishikawa | H02K 21/16 |
| 2017/0338707 | A1 | 11/2017 | Shono et al. | |
| 2018/0278104 | A1 | 9/2018 | Kono | |

FOREIGN PATENT DOCUMENTS

| | | | |
|---|---|---|---|
| JP | H09-294344 A | | 11/1997 |
| JP | 2014-150660 A | | 8/2014 |
| JP | 2015-073397 A | | 4/2015 |
| JP | 2015073397 A | * | 4/2015 |
| JP | 2015-116025 A | | 6/2015 |
| JP | 2017-028862 A | | 2/2017 |
| JP | 2017-192211 A | | 10/2017 |
| JP | 2018-164378 A | | 10/2018 |
| WO | 2013/051617 A1 | | 4/2013 |
| WO | 2016/104418 A1 | | 6/2016 |

OTHER PUBLICATIONS

Office Action dated Oct. 25, 2022 in connection with counterpart Australian Patent Application No. 2019455656.

International Search Report of the International Searching Authority dated Sep. 10, 2019 for the corresponding international application No. PCT/JP2019/025334 (and English translation).

Extended European Search Report dated Jun. 7, 2022 in connection with counterpart European Patent Application No. 19935152.9.

Office Action dated Sep. 6, 2022 in connection with corresponding Japanese Patent Application No. 2021-528732 (and English Translation).

* cited by examiner

ROTOR, ELECTRIC MOTOR, COMPRESSOR, AND AIR CONDITIONER

CROSS REFERENCE TO RELATED APPLICATION

This application is a U.S. national stage application of International Patent Application No. PCT/JP2019/025334 filed on Jun. 26, 2019, the disclosure of which is incorporated herein by reference.

TECHNICAL FIELD

The present invention relates to a rotor for use in an electric motor.

BACKGROUND

Rotors having magnet insertion holes provided with flux barrier parts (also referred to as "flux barriers"), which are space, have been used. In such a rotor, leakage flux can be reduced, and thus motor efficiency can be enhanced. However, because of the presence of thin portions between the outer peripheral surface of the rotor and the flux barrier parts, stress tends to be concentrated on these thin portions during rotation of the rotor. As the rotation speed of the rotor increases, this stress increases, and as a result, the rotor, especially the thin portions, is easily deformed. In view of this, a rotor having a center rib (also simply referred to as a "rib") between two magnet insertion holes is proposed (see, for example, Patent Reference 1). In the rotor having the center rib, a part of stress occurring in the rotor is dispersed to the center rib, and thus stress generated on the thin portions is reduced. Accordingly, deformation of the rotor can be prevented.

PATENT REFERENCE

Patent Reference 1: Japanese Patent Application Publication No. 2017-192211

With a conventional technique, however, in the case where the center rib is present between two magnet insertion holes, the strength of the rotor to a centrifugal force increases, but magnetic flux passing through the center rib, that is, leakage flux, increases, and power of an electric motor decreases, disadvantageously.

SUMMARY

An object of the present invention is to enhance power of an electric motor.

A rotor according to an aspect of the present invention includes: a rotor core including a first magnet insertion hole, a second magnet insertion hole, and a center lib between the first magnet insertion hole and the second magnet insertion hole;

a first permanent magnet disposed in the first magnet insertion hole, the first permanent magnet being W1 mm long in a longitudinal direction in a plane perpendicular to an axial direction; and a second permanent magnet disposed in the second magnet insertion hole, the second permanent magnet being W1 mm long in a longitudinal direction in the plane, wherein the first magnet insertion hole and the second magnet insertion hole are disposed in a V shape so that a center of one pair of the first magnet insertion hole and the second magnet insertion hole projects toward a center of the rotor core in the plane, the first magnet insertion hole includes a first magnet disposition part in which the first permanent magnet is disposed, a first flux barrier part communicating with the first magnet disposition part, a first outside opening part located on an outer side with respect to the first magnet disposition part in a radial direction of the rotor core, the first outside opening part having a radius of curvature of R1 mm in the plane, and a first inside opening part located on an inner side with respect to the first magnet disposition part in the radial direction, the first inside opening part having a radius of curvature of R2 mm in the plane, and the second magnet insertion hole includes a second magnet disposition part in which the second permanent magnet is disposed, a second flux barrier part communicating with the second magnet disposition part, a second outside opening part located on an outer side with respect to the second magnet disposition part in the radial direction, the second outside opening part having a radius of curvature of R1 mm in the plane, and a second inside opening part located on an inner side with respect to the second magnet disposition part in the radial direction, the second inside opening part having a radius of curvature of R2 mm in the plane, and the rotor satisfies $R1>R2$ and $0<(R1+R2)/W1<0.082$.

An electric motor according to another aspect of the present invention includes:

a stator; and the rotor disposed inside the stator.

A compressor according to yet another aspect of the present invention includes:

a closed container;

a compression device disposed inside the closed container; and the electric motor to drive the compression device.

An air conditioner according to still another aspect includes:

the compressor; and a heat exchanger.

According to the present invention, power of the electric motor can be enhanced.

DETAILED DESCRIPTION

First Embodiment

In an xyz orthogonal coordinate system shown in each drawing, a z-axis direction (z axis) represents a direction parallel to an axis Ax of an electric motor 1, an x-axis direction (x axis) represents a direction orthogonal to the z-axis direction (z axis), and a y-axis direction (y axis) represents a direction orthogonal to both the z-axis direction and the x-axis direction. The axis Ax is a center of a stator 3, and is also a rotation center of a rotor 2. A direction parallel to the axis Ax is also referred to as an "axial direction of the electric motor 1," an "axial direction of the rotor 2," or simply as an "axial direction." The "radial direction" is a radial direction of the rotor 2 or the stator 3, and is a direction orthogonal to the axis Ax. An xy plane is a plane perpendicular to the axial direction. An arrow D1 represents a circumferential direction about the axis Ax. The circumferential direction of the rotor 2 or the stator 3 will be also simply referred to as a "circumferential direction."

<Structure of Electric motor 1>

Figure 1:
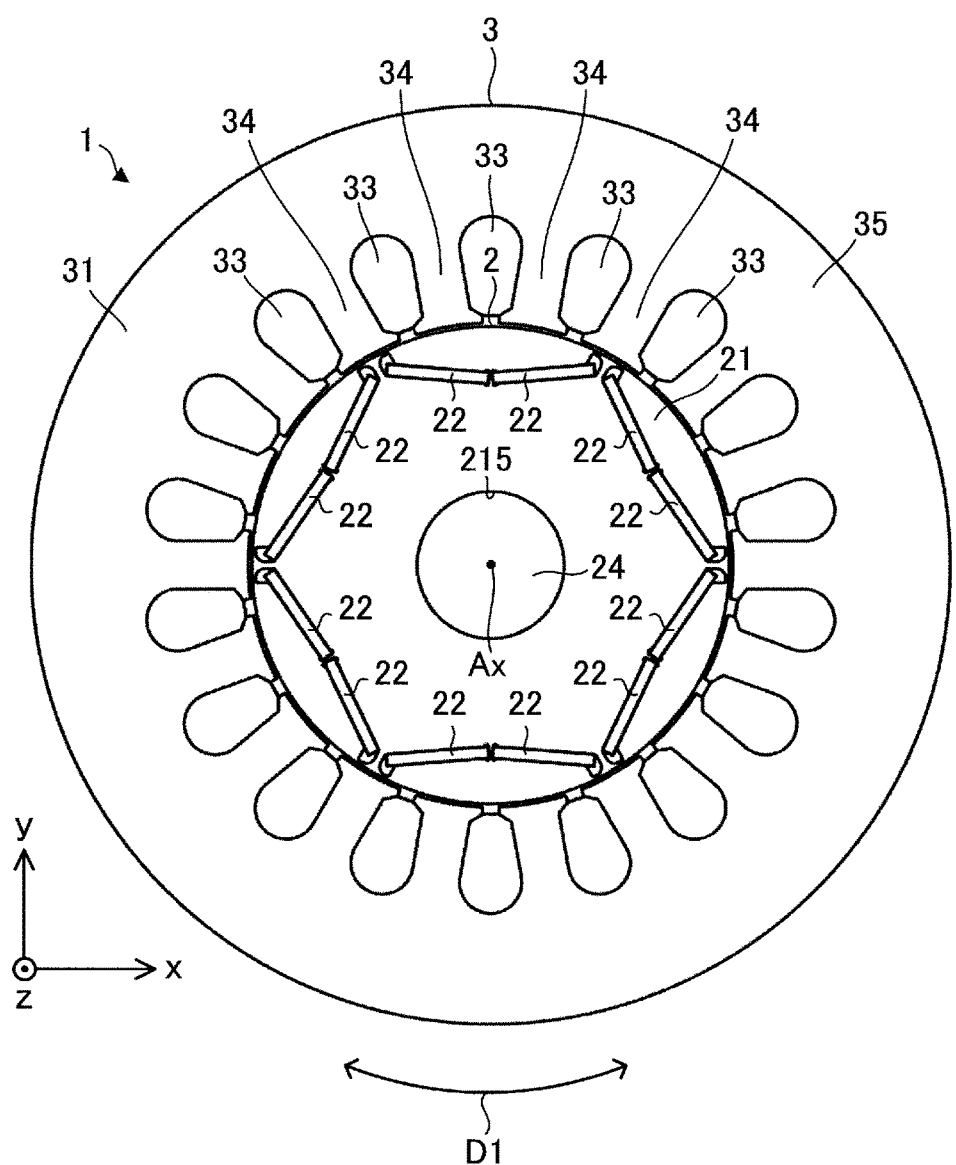
FIG. 1 is a plan view schematically illustrating a structure of an electric motor according to a first embodiment of the present invention.

FIG. 1 is a plan view schematically illustrating a structure of the electric motor 1 according to a first embodiment of the present invention.

The electric motor 1 includes the rotor 2 and the stator 3.

In this embodiment, the electric motor 1 is, for example, a three-phase synchronous motor. Specifically, the electric motor 1 is a permanent magnet synchronous motor (also called a brushless DC motor) such as a permanent magnet-embedded motor.

The rotor 2 is rotatably disposed inside the stator 3. An air gap is formed between the rotor 2 and the stator 3. The air gap is, for example, from 0.3 mm to 1 mm. The rotor 2 rotates about an axis Ax. The rotor 2 includes a rotor core 21, at least one permanent magnet 22, and a shaft 24.

The stator 3 is disposed outside the rotor 2. The stator 3 includes, for example, an annular stator core 31 and a stator winding wound around the stator core 31. In the example illustrated in FIG. 1, the stator 3 includes a yoke 35 extending in the circumferential direction of the stator 3, and a plurality of teeth 34 extending radially from the yoke 35. In the example illustrated in FIG. 1, the stator core 31 includes 18 teeth 34. Space between the teeth 34 is at least one slot 33 in which the stator winding is disposed.

The stator winding used for the stator 3 is, for example, a winding in which an insulation film is formed around a conductor such as copper or aluminium. The stator winding forms a coil for generating a rotation magnetic field. When a current flows in the stator winding, a rotation magnetic field occurs. The number of windings and the diameter of the stator winding are set in accordance with, for example, a voltage applied to the stator winding, the rotation speed of the electric motor 1, or the cross-sectional area of the slot.

The stator core 31 of the stator 3 is constituted by, for example, annular electromagnetic steel sheets stacked in the axial direction. Each of the electromagnetic steel sheets is punched in a predetermined shape beforehand. The thickness of each electromagnetic steel sheet of the stator 3 is, for example 0.1 mm to 0.7 mm. In this embodiment, the thickness of each electromagnetic steel sheet of the stator 3 is 0.35 mm. The electromagnetic steel sheets are fixed together by swaging.

A structure of the rotor 2 will be described specifically.

Figure 2:
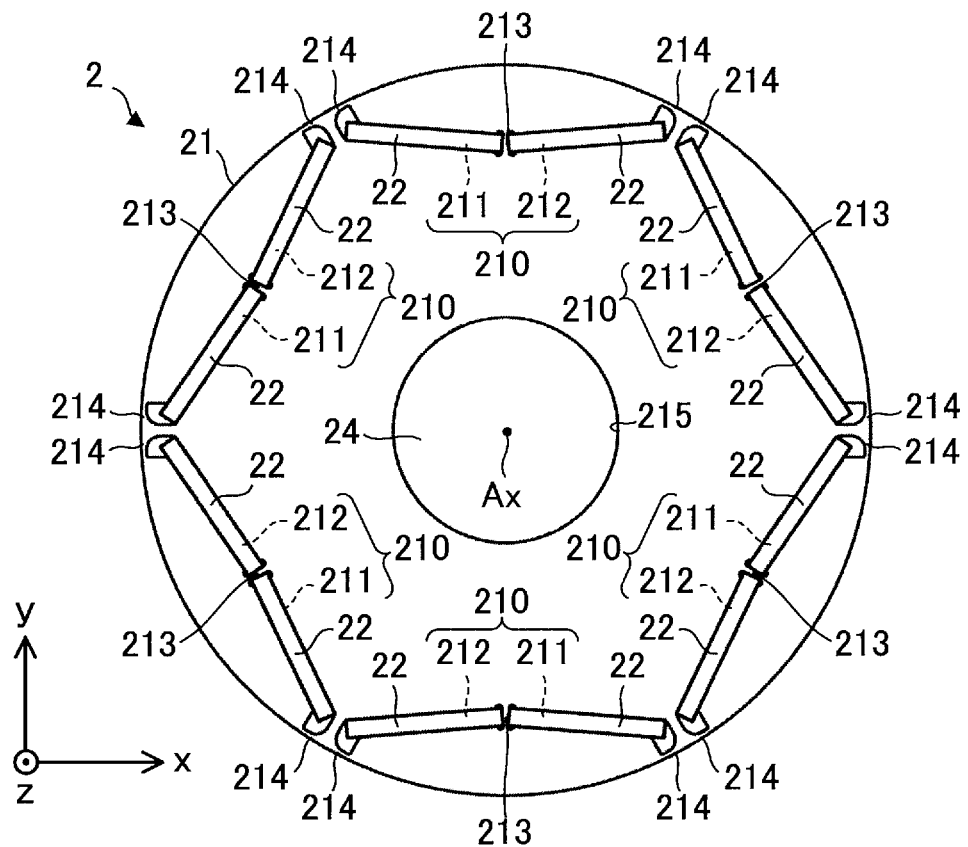
FIG. 2 is a plan view schematically illustrating a structure of a rotor.

FIG. 2 is a plan view schematically illustrating the structure of the rotor 2.

Figure 3:
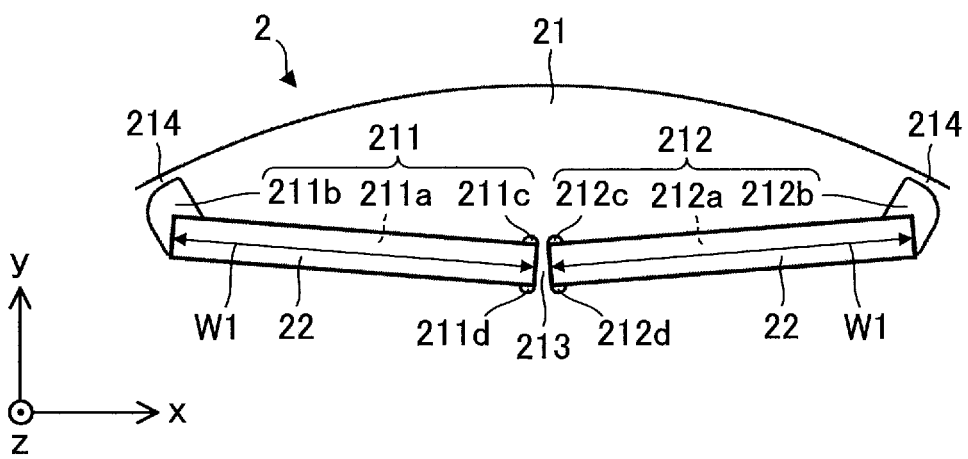
FIG. 3 is an enlarged view illustrating a region constituting one magnetic pole of the rotor.

FIG. 3 is an enlarged view illustrating a region constituting one magnetic pole of the rotor 2.

In the example illustrated in FIG. 2, the rotor 2 includes the rotor core 21, a plurality of permanent magnets 22 embedded in the rotor core 21, and the shaft 24 fitted in a shaft hole 215 of the rotor core 21. The rotor 2 includes two or more magnetic poles. Two or more permanent magnets 22 constitute one magnetic pole of the rotor 2. In this embodiment, the electric motor 2 is a permanent magnet-embedded electric rotor.

The rotor core 21 is an annular rotor core. The rotor core 21 is formed of, for example, a plurality of electromagnetic steel sheets. The rotor core 21 includes at least one pair of magnet insertion holes 210, at least one center rib 213, and at least one thin portion 214.

The rotor core 21 of the rotor 2 is constituted by, for example, annular electromagnetic steel sheets stacked in the axial direction. Each of the electromagnetic steel sheets is punched in a predetermined shape beforehand. The thickness of each electromagnetic steel sheet of the rotor 2 is, for example 0.1 mm to 0.7 mm. In this embodiment, the thickness of each electromagnetic steel sheet of the rotor 2 is 0.35 mm. The electromagnetic steel sheets are fixed together by swaging.

The pair of magnet insertion holes 210 includes a first magnet insertion hole 211 and a second magnet insertion hole 212. In the xy plane, the center of one pair of magnet insertion holes 210 projects toward the center (i.e., the axis Ax) of the rotor core 21. That is, one pair of magnet insertion holes 210 (i.e., the first magnet insertion hole 211 and the second magnet insertion hole 212) is disposed in a V shape in the xy plane.

The center lib 213 is a part of the rotor core 21, and extends in the radial direction. The center lib 213 is disposed between the first magnet insertion hole 211 and the second magnet insertion hole 212. Thus, the center lib 213 is located at a magnetic pole center part of the rotor 2.

As long as the rotor core 21 includes the center lib 213, arrangement of the pair of magnet insertion holes 210 (i.e., the first magnet insertion hole 211 and the second magnet insertion hole 212) is not limited to a V shape.

The first magnet insertion hole 211 includes a magnet disposition part 211a (also referred to as a first magnet disposition part) in which the permanent magnet 22 as a first permanent magnet is disposed, a flux barrier part 211b (also referred to as a first flux barrier part) that is space communicating with the magnet disposition part 211a, an outside opening part 211c (also referred to as a first outside opening part), and an inside opening part 211d (also referred to as a first inside opening part).

The second magnet insertion hole 212 includes a magnet disposition part 212a (also referred to as a second magnet disposition part) in which the permanent magnet 22 as a second permanent magnet is disposed, a flux barrier part 212b (also referred to as a second flux barrier part) that is space communicating with the magnet disposition part 212a, an outside opening part 212c (also referred to as a second outside opening part), and an inside opening part 212d (also referred to as a second inside opening part).

The flux barrier part 211b is located at an inter-pole part of the rotor 2 or near the inter-pole part. Similarly, the flux barrier part 212b is located at an inter-pole part of the rotor 2 or near the inter-pole part.

The thin portion 214 between the outer peripheral surface of the rotor core 21 and the first magnet insertion hole 211 will be also referred to as a "first thin portion." The thin portion 214 between the outer peripheral surface of the rotor core 21 and the second magnet insertion hole 212 will be also referred to as a "second thin portion." In this case, the first thin portion is a region between the flux barrier part 211b and the outer peripheral surface of the rotor core 21, and the second thin portion is a region between the flux barrier part 212b and the outer peripheral surface of the rotor core 21.

A minimum width of each thinner portion 214 in the radial direction is, for example, greater than or equal to the thickness of one electromagnetic steel sheet of the rotor core 21. The minimum width of each thinner portion 214 in the radial direction is preferably substantially equal to the thickness of one electromagnetic steel sheet of the rotor core 21. In this case, an increase of leakage flux in each thin portion 214 can be effectively suppressed.

In the example illustrated in FIG. 2, the rotor core 21 includes six magnet insertion holes 210, six center ribs 213, and twelve thin portions 214, and the shaft hole 215. The six magnet insertion holes 210 are arranged in the circumferential direction of the rotor 2. Each first magnet insertion hole 211 and each second magnet insertion hole 212 extend in the axial direction.

The permanent magnet 22 as the first permanent magnet is placed in each first magnet insertion hole 211. The permanent magnet 22 as the second permanent magnet is placed in each second magnet insertion hole 212.

The shaft 24 is fixed to the shaft hole 215 by a technique such as shrink fitting or press fitting. When a current flows in the stator winding of the stator 3, the rotor 2 (specifically, the rotor core 21) rotates, and rotation energy of the rotor core 21 is transferred to the shaft 24.

Each permanent magnet 22 is, for example, a flat-plate permanent magnet. Each permanent magnet 22 is, for example, a rare earth magnet containing neodymium (Nd) and dysprosium (Dy). The rare earth magnet has a high residual flux density and a high coercive force. Thus, in the case of using rare earth magnets as the permanent magnets 22, efficiency of the electric motor 1 can be enhanced. As the permanent magnets 22, magnets except for rare earth magnets, such as ferrite sintered magnets, may be used.

Each permanent magnet 22 is magnetized in a direction perpendicular to the longitudinal direction of the permanent magnet 22 in the xy plane. That is, each permanent magnet 22 is magnetized in the lateral direction of the permanent magnet 22 in the xy plane.

In the xy plane, each permanent magnet 22 is W1 mm long in the longitudinal direction. The length of W1 is a maximum length of each permanent magnet 22 in the longitudinal direction. It should be noted that the length of each permanent magnet 22 in the longitudinal direction in the first magnet insertion hole 211 may be different from the length of each permanent magnet 22 in the longitudinal direction in the second magnet insertion hole 212.

One pair of magnet insertion holes 210 is associated with one magnetic pole of the rotor 2. Specifically, two permanent magnets 22 (i.e., the first permanent magnet and the second permanent magnet) placed in one pair of magnet insertion holes 210 constitute one magnetic pole (i.e., a north pole or a south pole) of the rotor 2. The number of magnetic poles of the rotor 2 only needs to two or more. In this embodiment, the rotor 2 has six magnetic poles.

Each of the magnetic poles ("each magnetic pole" or "magnetic pole") refers to a region serving as a north pole or a south pole of the rotor 2.

In general, while a rotor rotates, a centrifugal force is exerted on a rotor core. Thus, if the rotor core does not include a center lib, large stress is applied to thin portions between the outer peripheral surface of the rotor core and magnet insertion holes (specifically, flux barrier parts). If this stress is large, the rotor core (especially, the thin portions) is easily deformed. On the other hand, in this embodiment, since the rotor core 21 includes the center ribs 213, part of the stress generated in the rotor 2 is dispersed to the center ribs 213, and thus stress applied to the thin portions 214 is alleviated. Accordingly, deformation of the rotor core 21, especially the thin portions 214, can be prevented. As a result, the electric motor 1 can rotate at high speed and consequently power of the electric motor 1 can be enhanced.

Figure 4:
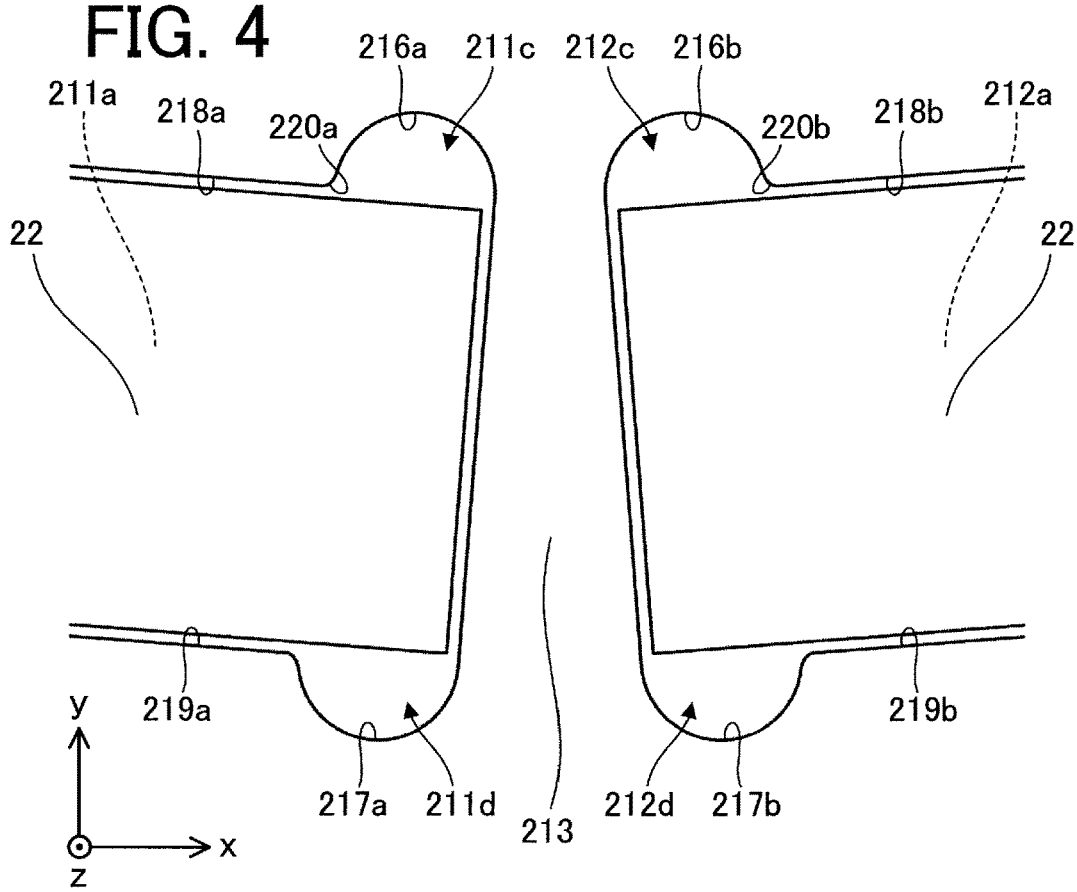
FIG. 4 is an enlarged view illustrating a peripheral structure of a center lib.
Figure 5:
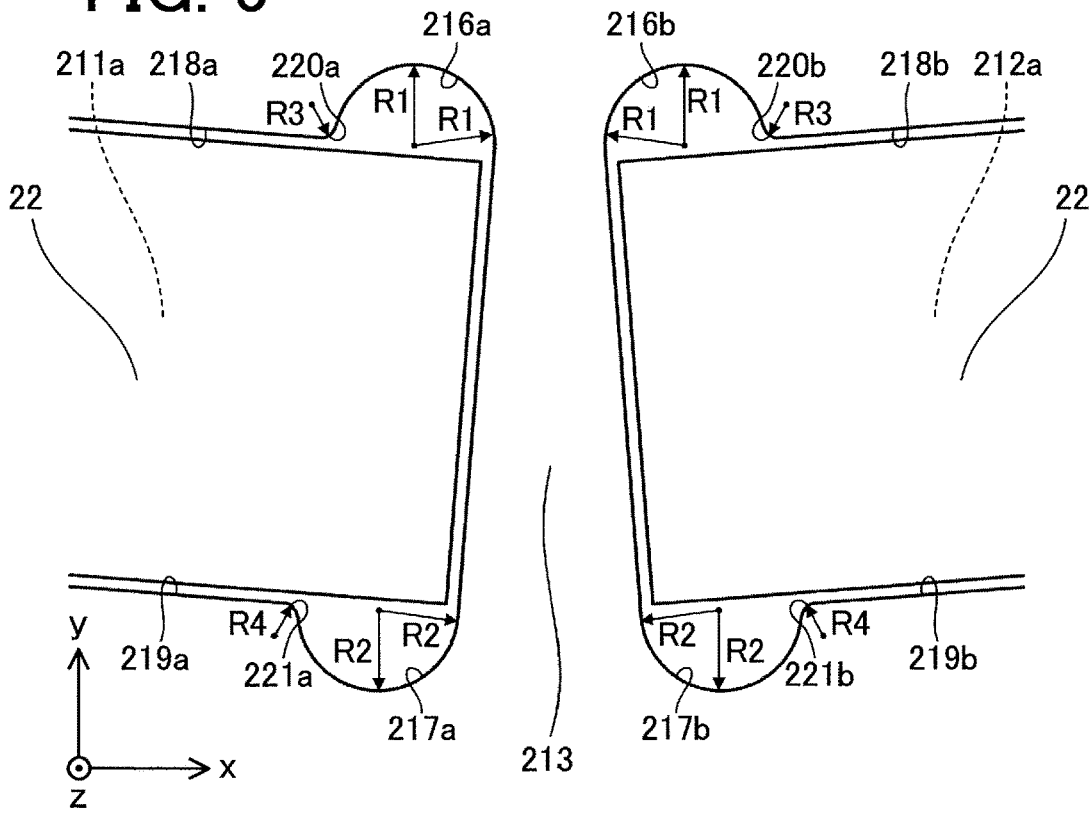
FIG. 5 is an enlarged view illustrating the peripheral structure of the center lib.

FIGS. 4 and 5 are enlarged views each illustrating a peripheral structure of the center lib 213.

As illustrated in FIG. 4, the first magnet insertion hole 211 includes the magnet disposition part 211a, the flux barrier part 211b (FIG. 3), the outside opening part 211c, and the inside opening part 211d. The second magnet insertion hole 212, includes the magnet disposition part 212a, the flux barrier part 212b (FIG. 3), the outside opening part 212c, and the inside opening part 212d.

The outside opening part 211c is located on an outer side of the magnet disposition part 211a in the radial direction of the rotor core 21, and adjacent to the center lib 213. The outside opening part 211c has a radius of curvature of R1 in the xy plane. Thus, the outside opening part 211c projects from the magnet disposition part 211a outward in the radial direction.

The inside opening part 211d is located on an inner side of the magnet disposition part 211a in the radial direction of the rotor core 21, and adjacent to the center lib 213. The inside opening part 211d has a radius of curvature of R2 in the xy plane. Thus, the inside opening part 211d projects from the magnet disposition part 211a inward in the radial direction.

Since the rotor core 21 includes the outside opening part 211c and the inside opening part 211d, demagnetization of the permanent magnets 22 (especially, the permanent magnets 22 in the first magnet insertion holes 211) generated by a magnetic field from the stator winding of the stator 3 can be reduced. As a result, power of the electric motor 1 can be enhanced.

The outside opening part 212c is located on an outer side of the magnet disposition part 212a in the radial direction of the rotor core 21, and adjacent to the center lib 213. The outside opening part 212c has a radius of curvature of R1 in the xy plane. Thus, the outside opening part 212c projects from the magnet disposition part 212a outward in the radial direction.

The inside opening part 212d is located on an inner side of the magnet disposition part 212a in the radial direction of the rotor core 21, and adjacent to the center lib 213. The inside opening part 212d has a radius of curvature of R2 in the xy plane. Thus, the inside opening part 212d projects from the magnet disposition part 212a inward in the radial direction.

Since the rotor core 21 includes the outside opening part 212c and the inside opening part 212d, demagnetization of the permanent magnets 22 (especially, the permanent magnets 22 in the second magnet insertion holes 212) generated by a magnetic field from the stator winding of the stator 3 can be reduced. As a result, power of the electric motor 1 can be enhanced.

In this embodiment, the radius of curvature of R1 is 0.5 mm, the radius of curvature of R2 is 0.3 mm, and the length of W1 of each permanent magnet 22 is 21.5 mm. It should be noted that the radius of curvature of R1, the radius of curvature of R2, and the length of W1 of each permanent magnet 22 are not limited to these examples. The shape of the first magnet insertion hole 211 may be different from the shape of the second magnet insertion hole 212.

As illustrated in FIG. 4, the rotor core 21 includes, at each magnetic pole, an outside curved part 216a (also referred to as a first outside curved part), an outside curved part 216b (also referred to as a second outside curved part), an inside curved part 217a (also referred to as a first inside curved part), an inside curved part 217b (also referred to as a second inside curved part), an outside support part 218a (also referred to as a first outside support part), an outside support part 218b (also referred to as a second outside support part), an inside support part 219a (also referred to as a first inside support part), an inside support part 219b (also referred to as a second inside support part), an outside connection part 220a (also referred to as a first outside connection part), an outside connection part 220b (also referred to as a second outside connection part), an inside connection part 221a (also referred to as a first inside connection part), and an inside connection part 221b (also referred to as a second inside connection part).

The outside curved part 216a defines the outside opening part 211c. The outside curved part 216a has a curvature of 1/R1 in the xy plane. Accordingly, the outside opening part 211c has a radius of curvature of R1 in the xy plane.

The outside curved part 216b defines the outside opening part 212c. The outside curved part 216b has a curvature of 1/R1 in the xy plane. Accordingly, the outside opening part 212c has a radius of curvature of R1 in the xy plane.

The inside curved part 217a defines the inside opening part 211d. The inside curved part 217a has a curvature of 1/R2 in the xy plane. Accordingly, the inside opening part 211d has a radius of curvature of R2 in the xy plane.

The inside curved part 217b defines the inside opening part 212d. The inside curved part 217b has a curvature of 1/R2 in the xy plane. Accordingly, the inside opening part 212d has a radius of curvature of R2 in the xy plane.

The outside support part 218a supports the permanent magnet 22 in the first magnet insertion hole 211. The outside support part 218a defines the magnet disposition part 211a.

The outside support part 218b supports the permanent magnet 22 in the second magnet insertion hole 212. The outside support part 218b defines the magnet disposition part 212a.

The inside support part 219a supports the permanent magnet 22 in the first magnet insertion hole 211. The inside support part 219a defines the magnet disposition part 211a.

The inside support part 219b supports the permanent magnet 22 in the second magnet insertion hole 212. The inside support part 219b defines the magnet disposition part 212a.

The outside connection part 220a is located between the outside curved part 216a and the outside support part 218a, and connects the outside curved part 216a and the outside support part 218a. The outside connection part 220a has a radius of curvature of R3 in the xy plane. In other words, the outside connection part 220a has a curvature of 1/R3 in the xy plane.

The outside connection part 220b is located between the outside curved part 216b and the outside support part 218b, and connects the outside curved part 216b and the outside support part 218b. The outside connection part 220b has a radius of curvature of R3 in the xy plane. In other words, the outside connection part 220b has a curvature of 1/R3 in the xy plane.

The inside connection part 221a is located between the inside curved part 217a and the inside support part 219a, and connects the inside curved part 217a and the inside support part 219a. The inside connection part 221a has a radius of curvature of R4 in the xy plane. In other words, the inside connection part 221a has a curvature of 1/R4 in the xy plane.

The inside connection part 221b is located between the inside curved part 217b and the inside support part 219b, and connects the inside curved part 217b and the inside support part 219b. The inside connection part 221b has a radius of curvature of R4 in the xy plane. In other words, the inside connection part 221b has a curvature of 1/R4 in the xy plane.

The relationship between the radii of curvature of R1 and R2 satisfies R1>R2. Accordingly, stress concentrated on the center libs 213 is dispersed, and thus, mechanical strength of the rotor core 21 to a centrifugal force generated in the rotor 2 can be increased, and deformation of the rotor core 21, especially the thin portions 214, and be prevented. Consequently, the electric motor 1 can rotate at high speed, and thus power of the electric motor 1 can be enhanced. In addition, a magnetic resistance becomes large in the outside opening part 211c and the outside opening part 212c, and thus, demagnetization in each permanent magnet 22 can be reduced. On the other hand, magnetic resistance in the inside opening part 211d and the inside opening part 212d is smaller than that in the outside opening part 211c and the outside opening part 212c, and thus a magnetic force of each permanent magnet 22 can be effectively used. That is, if the rotor 2 satisfies R1>R2, demagnetization of the permanent magnets 22 can be reduced, and power of the electric motor 1 can be enhanced.

The relationship between the radii of curvature of R3 and R4 satisfies R3>R4. Accordingly, it is possible to achieve both reduction of demagnetization of the permanent magnets 22 and increase in power of the electric motor 1. Specifically, as the radius of curvature of R3 increases, the lengths of the outside support part 218a and the outside support part 218b decrease. Accordingly, the outside opening part 211c and the outside opening part 212c become larger, and magnetic resistance increases. As a result, demagnetization in each permanent magnet 22 can be reduced. On the other hand, as the radius of curvature of R4 decreases, the lengths of the inside support part 219a and the inside support part 219b increase. Accordingly, the inside opening part 211d and the inside opening part 212d become smaller, and thus a magnetic force of each permanent magnet 22 can be effectively used. As a result, it is possible to achieve both reduction of demagnetization of the permanent magnets 22 and increase in power of the electric motor 1.

Figure 6:
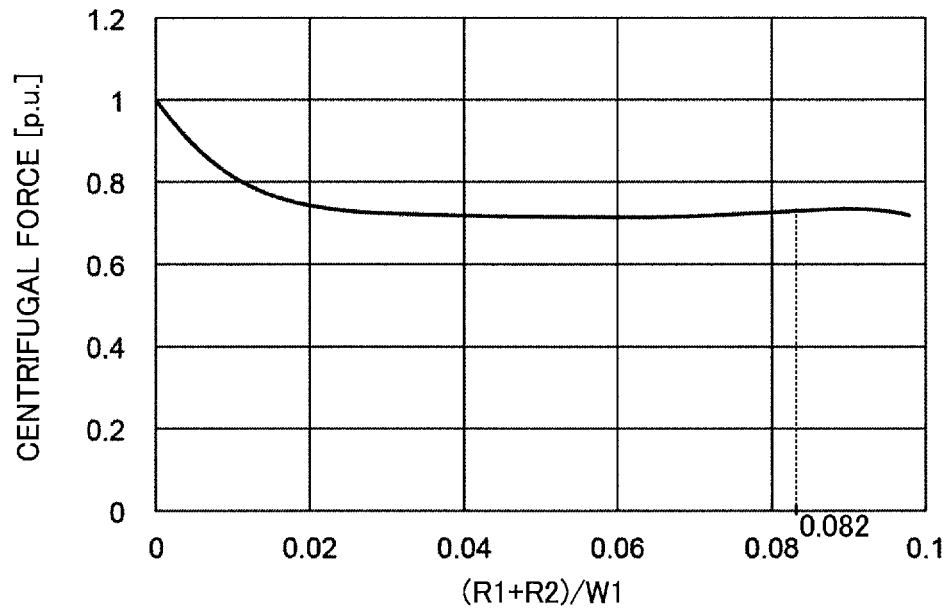
FIG. 6 is a graph showing a relationship between a centrifugal force [p.u.] generated during rotation of the rotor and a ratio of radii of curvature.

FIG. 6 is a graph showing a relationship between a centrifugal force [p.u.] generated during rotation of the rotor 2 and a ratio between radii of curvature (specifically, a ratio of radius of curvature of R1+R2 to the length of W1 of each permanent magnet).

As shown in FIG. 6, the rotor 2 preferably satisfies 0<(R1+R2)/W1<0.082. Accordingly, a centrifugal force generated during rotation of the rotor 2 can be reduced, and deformation of the rotor core 21, especially the thin portions 214, can be prevented. The rotor 2 more preferably satisfies 0.02<(R1+R2)/W1<0.082. Accordingly, a centrifugal force generated during rotation of the rotor 2 can be effectively reduced, and deformation of the rotor core 21, especially the thin portions 214, can be effectively prevented.

Figure 7:
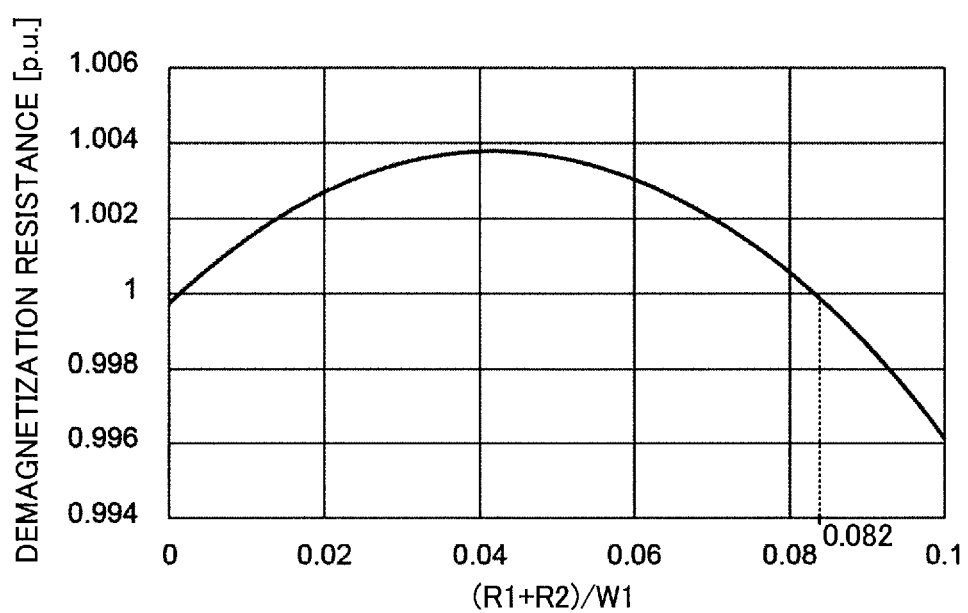
FIG. 7 is a graph showing a relationship between demagnetization resistance [p.u.] and a ratio of radii of curvature.

FIG. 7 is a graph showing a relationship between a demagnetization resistance [p.u.] and a ratio between radii of curvature (specifically, a ratio of radii of curvature of R1+R2 to the length of W1 of each permanent magnet). In this embodiment, the demagnetization resistance refers to the magnitude of a current flowing in the stator winding of the stator 3 when the amount of magnetic flux from the permanent magnets 22 decreases by 1%. That is, in FIG. 7, as the demagnetization resistance increases, the value of current flowing in the stator winding of the stator 3 can be increased. Accordingly, as the demagnetization resistance increases, power of the electric motor 1 can be enhanced.

As shown in FIG. 7, the rotor 2 preferably satisfies 0<(R1+R2)/W1<0.082. As a result, demagnetization resistance increases, and power of the electric motor 1 can be enhanced.

As the proportion of the radii of curvature of R1 and R2 to the length of W1 of each permanent magnet 22 increases, the area of the permanent magnet 22 facing the outside opening part 211c and the area of the permanent magnet 22 facing the outside opening part 212c increase. Accordingly, an effective amount of magnetic flux from each permanent magnet 22 decreases, and power of the electric motor 1 decreases. On the other hand, as the proportion of the radii of curvature of R1 and R2 to the length of W1 of each permanent magnet 22 decreases, the permanent magnets 22 are more easily demagnetized. Accordingly, the rotor 2 more preferably satisfies 0.02<(R1+R2)/W1<0.06. As a result, demagnetization resistance further increases, and power of the electric motor 1 can be enhanced.

In addition, if the rotor 2 satisfies R1>R2 and 0<(R1+R2)/W1<0.082, demagnetization of the permanent magnets 22 can be further reduced, and power of the electric motor 1 can be further enhanced.

If the rotor 2 satisfies R1>R2 and 0.02<(R1+R2)/W1<0.082, demagnetization of the permanent magnets 22 can be further reduced, and power of the electric motor 1 can be further enhanced.

If the rotor 2 satisfies R1>R2 and 0.02<(R1+R2)/W1<0.06, demagnetization of the permanent magnets 22 can be further reduced, and power of the electric motor 1 can be further enhanced.

Figure 8:
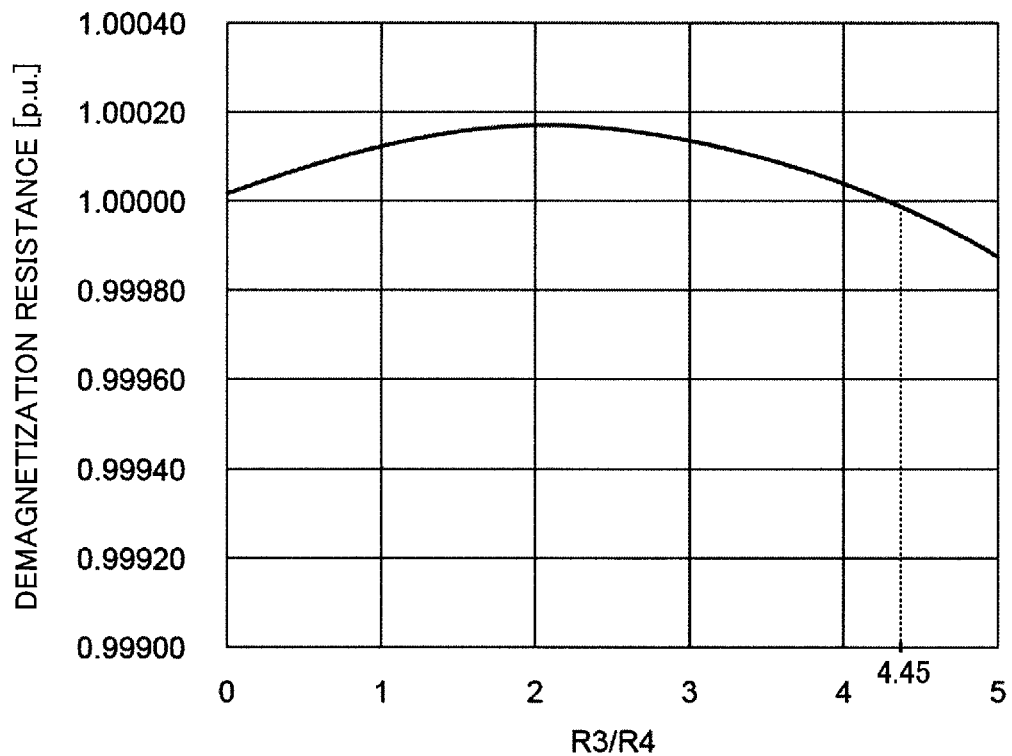
FIG. 8 is a graph showing a relationship between demagnetization resistance [p.u.] and a ratio of radii of curvature.

FIG. 8 is a graph showing a relationship between a demagnetization resistance [p.u.] and a ratio R3/R4 of a radius of curvature.

As shown in FIG. 8, the rotor 2 preferably satisfies 0<R3/R4<4.45. As a result, demagnetization resistance increases, and power of the electric motor 1 can be enhanced. The rotor 2 more preferably satisfies 0<R3/R4<4. As a result, demagnetization resistance further increases, and power of the electric motor 1 can be enhanced.

The radii of curvature of R3 and R4 may be the same. In this case, the radii of curvature of R3 and R4 are, for example, 0.9 mm, and the rotor 2 satisfies R3/R4=1. As a result, demagnetization resistance can be enhanced, as compared to a conventional rotor (i.e., R3=R4=0).

Figure 9:
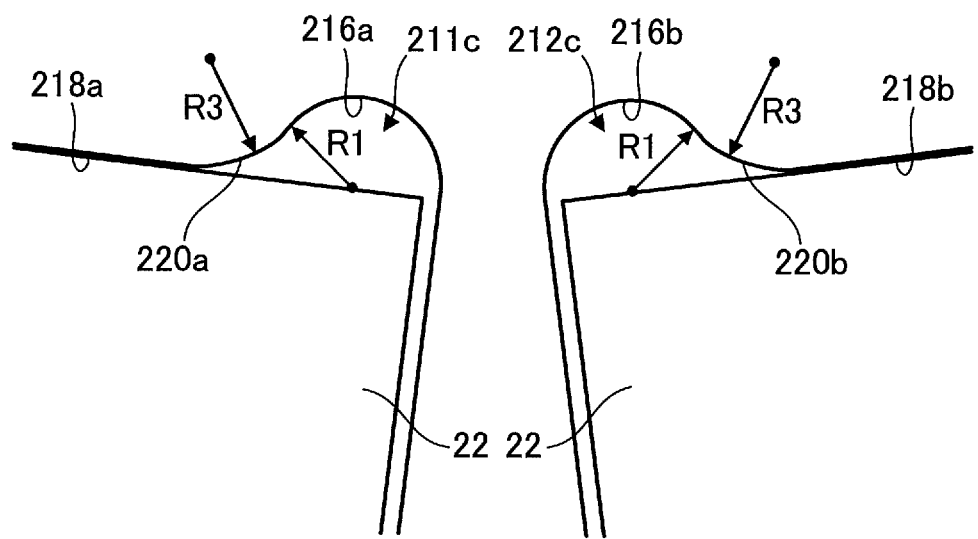
FIG. 9 is an enlarged view illustrating a peripheral structure of an outside opening part.

FIG. 9 is an enlarged view illustrating a peripheral structure of the outside opening part 211c.

As illustrated in FIG. 9, the radius of curvature of R3 may be larger than the radius of curvature of R1. As the radius of curvature of R3 increases, the outside support part 218a and the outside support part 218b become shorter. Accordingly, the outside opening part 211c and the outside opening part 212c become larger, and magnetic resistance increases. As a result, demagnetization in each permanent magnet 22 decreases, and power of the electric motor 1 can be further enhanced.

Figure 10:
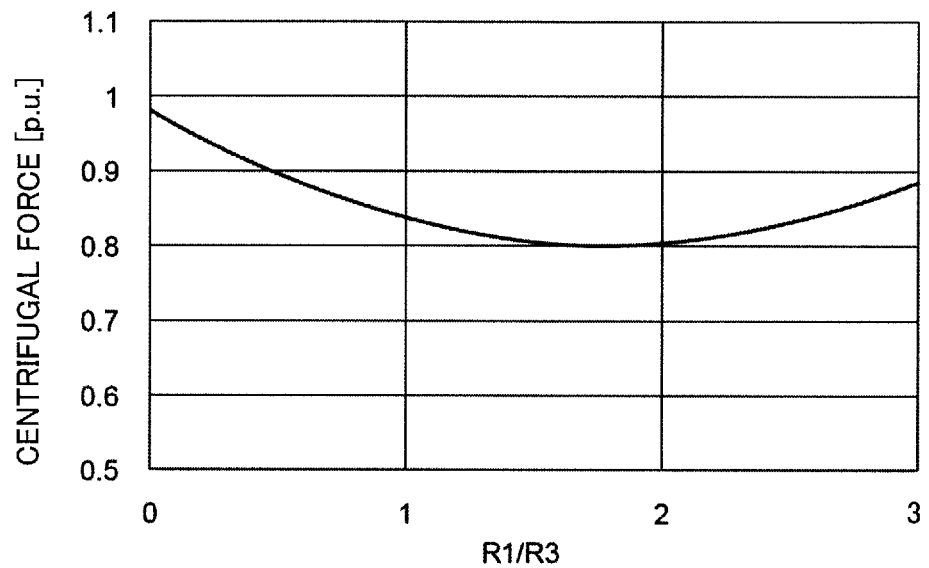
FIG. 10 is a graph showing a relationship between a centrifugal force [p.u.] and a ratio of radii of curvature.

FIG. 10 is a graph showing a relationship between a centrifugal force [p.u.] and a ratio of R1/R3 of a radius of curvature.

As shown in FIG. 10, the rotor 2 preferably satisfies 0<R1/R3<3. Accordingly, a centrifugal force generated during rotation of the rotor 2 can be reduced, and deformation of the rotor core 21, especially the thin portions 214, can be prevented.

Figure 11:
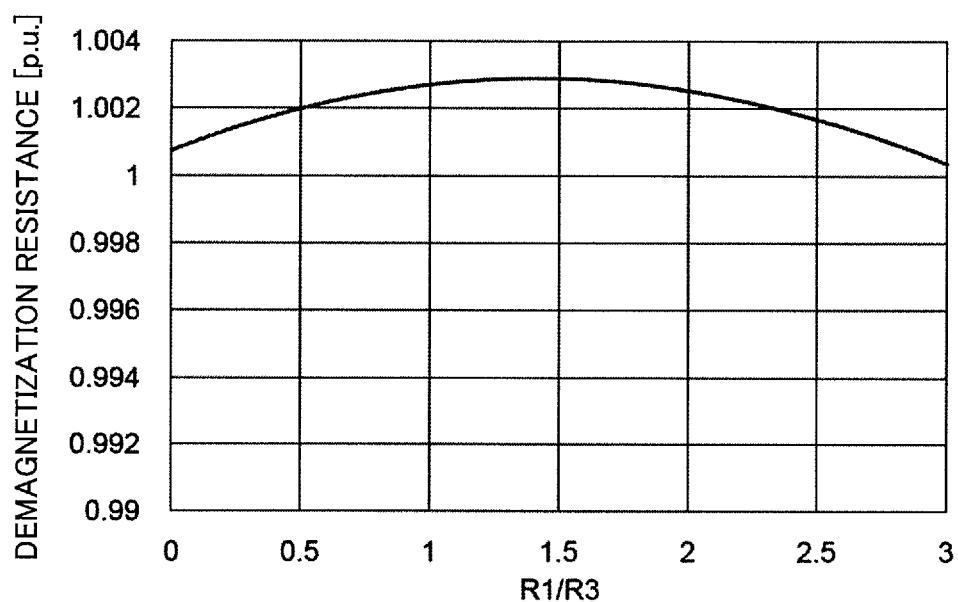
FIG. 11 is a graph showing a relationship between a demagnetization resistance [p.u.] and a ratio of radii of curvature.

FIG. 11 is a graph showing a relationship between a demagnetization resistance [p.u.] and a ratio of R1/R3 of a radius of curvature.

As shown in FIG. 11, the rotor 2 preferably satisfies 0<R1/R3<3. As a result, demagnetization resistance increases, and power of the electric motor 1 can be enhanced.

The rotor 2 more preferably satisfies 0.5<R1/R3<3. Accordingly, a centrifugal force generated during rotation of the rotor 2 can be further reduced, and deformation of the rotor core 21, especially the thin portions 214, can be further prevented.

In the examples shown in FIGS. 10 and 11, the radius of curvature of R1 is, for example, 0.5 mm, and the radius of curvature of R3 is, for example, 0.6 mm, and the rotor 2 satisfies 0<R1/R3<3. As a result, demagnetization resistance can be enhanced, as compared to a conventional rotor (i.e., R1=R3=0).

Second Embodiment

A compressor 300 according to a second embodiment of the present invention will be described.

Figure 12:
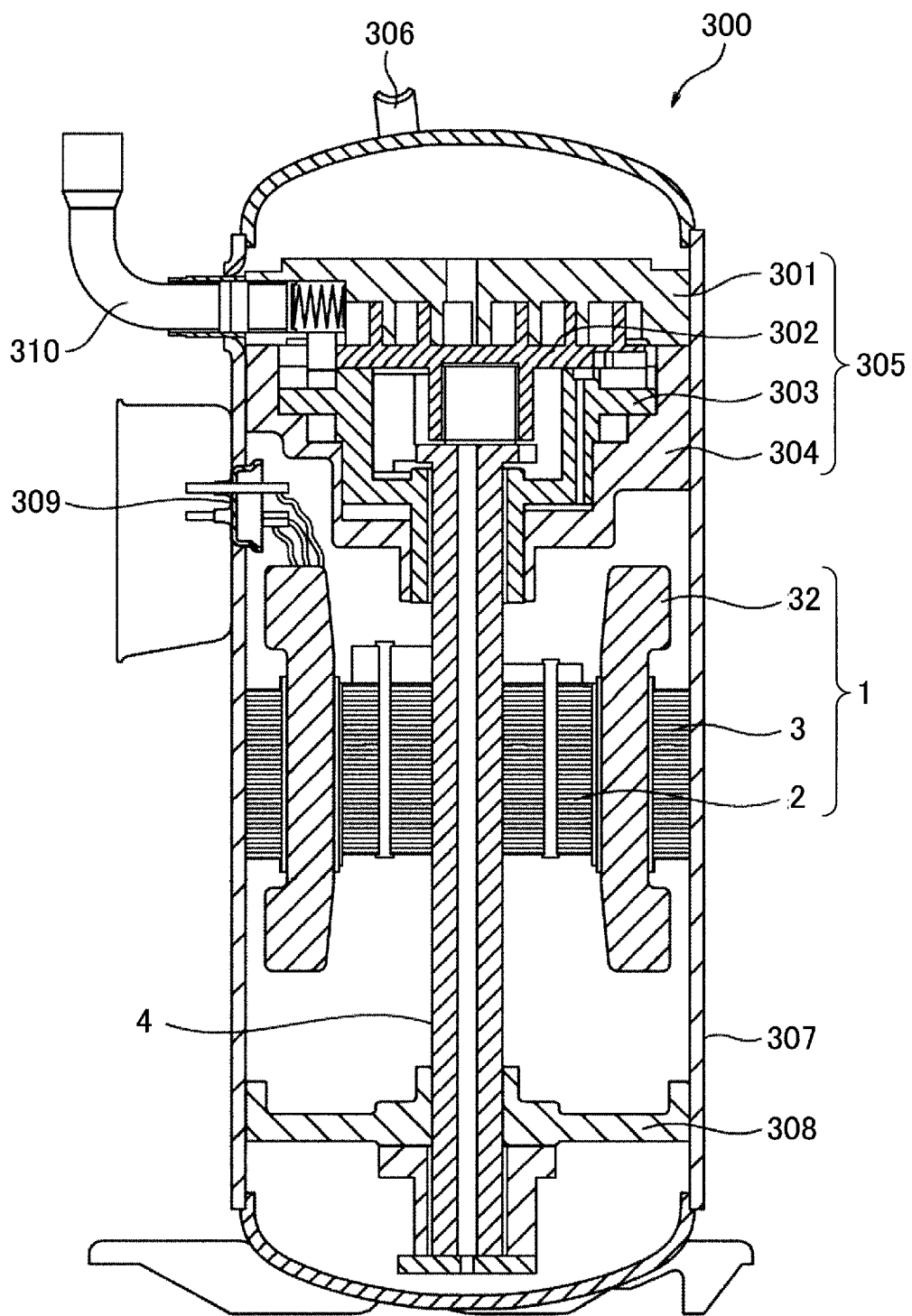
FIG. 12 is a cross-sectional view schematically illustrating a structure of a compressor according to a second embodiment of the present invention.

FIG. 12 is a cross-sectional view schematically illustrating a structure of the compressor 300.

The compressor 300 includes an electric motor 1 serving as an electric element, a closed container 307 serving as a housing, and a compression mechanism 305 serving as a compression element (also referred to as a compression device). In this embodiment, the compressor 300 is a scroll compressor. It should be noted that the compressor 300 is not limited to a scroll compressor. The compressor 300 may be a compressor other than the scroll compressor, for example, may be a rotary compressor.

The electric motor 1 in the compressor 300 is the electric motor 1 described in the first embodiment. The electric motor 1 drives the compression mechanism 305.

The compressor 300 also includes a subframe 308 supporting a lower end (i.e., an end opposite to the compression mechanism 305) of the shaft 24.

The compression mechanism 305 is disposed inside the closed container 307. The compressor mechanism 305 includes a fixed scroll 301 having a spiral portion, a swing scroll 302 having a spiral portion forming a compression chamber between the spiral portion of the swing scroll 302 and the spiral portion of the fixed scroll 301, a compliance frame 303 holding the upper end of the shaft 24, and a guide frame 304 fixed to the closed container 307 and holding the compliance frame 303.

A suction pipe 310 penetrating the closed container 307 is press fitted in the fixed scroll 301. The closed container 307 is provided with a discharge pipe 306 that discharges a high-pressure refrigerant gas discharged from the fixed scroll 301, to the outside. The discharge pipe 306 communicates with an opening disposed between the compressor mechanism 305 of the closed container 307 and the electric motor 1.

The electric motor 1 is fixed to the closed container 307 by fitting the stator 3 in the closed container 307. A configuration of the electric motor 1 has been described above. To the closed container 307, a glass terminal 309 for supplying electric power to the electric motor 1 is fixed by welding.

When a current flows in a stator winding 32 of the electric motor 1, the electric motor 1 is driven. When the electric motor 2 rotates, this rotation is transferred to the swing scroll 302, and the swing scroll 302 swings. When the swing scroll 302 swings, the volume of the compression chamber formed by the spiral portion of the swing scroll 302 and the spiral portion of the fixed scroll 301 changes. Then, a refrigerant gas is sucked from the suction pipe 310, compressed, and then discharged from the discharge pipe 306.

The compressor 300 includes the electric motor 1 described in the first embodiment, and thus, obtains advantages described in the first embodiment.

In addition, since the compressor 300 includes the electric motor 1 described in the first embodiment, the efficient compressor 300 can be provided.

Third Embodiment

A refrigerating and air conditioning apparatus 7 serving as an air conditioner and including a compressor 300 according to a third embodiment will be described.

Figure 13:
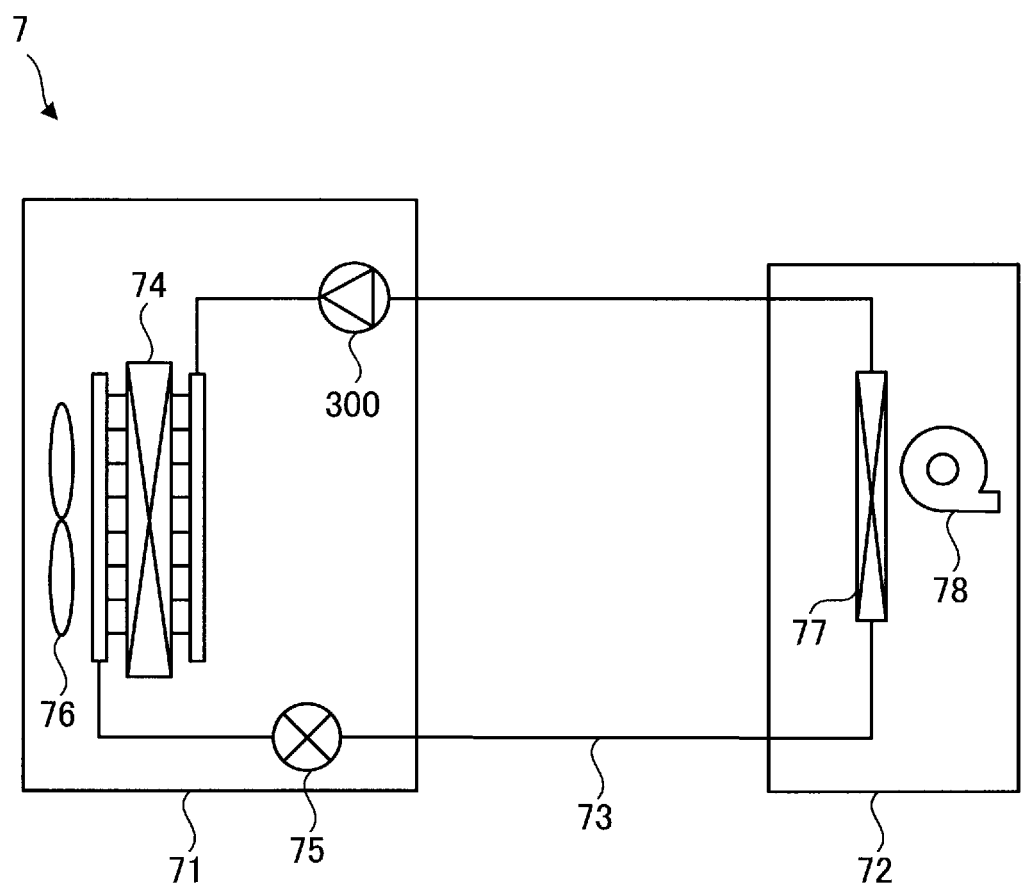
FIG. 13 is a diagram schematically illustrating a configuration of a refrigerating and air conditioning apparatus according to a third embodiment of the present invention.

FIG. 13 is a diagram schematically illustrating a configuration of the refrigerating air conditioning device 7 according to the third embodiment.

The refrigerating and air conditioning apparatus 7 is capable of performing cooling and heating operations, for example. A refrigerant circuit diagram illustrated in FIG. 13 is an example of a refrigerant circuit diagram of an air conditioner capable of performing a cooling operation.

The refrigerating and air conditioning apparatus 7 according to the third embodiment includes an outdoor unit 71, an indoor unit 72, and a refrigerant pipe 73 connecting the outdoor unit 71 and the indoor unit 72.

The outdoor unit 71 includes a compressor 300, a condenser 74 as a heat exchanger, a throttling device 75, and an outdoor air blower 76 (first air blower). The condenser 74 condenses a refrigerant compressed by the compressor 300. The throttling device 75 decompresses the refrigerant condensed by the condenser 74 to thereby adjust a flow rate of the refrigerant. The throttling device 75 will be also referred to as a decompression device.

The indoor unit 72 includes an evaporator 77 as a heat exchanger, and an indoor air blower 78 (second air blower). The evaporator 77 evaporates the refrigerant decompressed by the throttling device 75 to thereby cool indoor air.

A basic operation of a cooling operation in the refrigerating and air conditioning apparatus 7 will now be described. In the cooling operation, a refrigerant is compressed by the compressor 300 and the compressed refrigerant flows into the condenser 74. The condenser 74 condenses the refrigerant, and the condensed refrigerant flows into the throttling device 75. The throttling device 75 decompresses the refrigerant, and the decompressed refrigerant flows into the evaporator 77. In the evaporator 77, the refrigerant evaporates, and the refrigerant (specifically a refrigerant gas) flows into the compressor 300 of the outdoor unit 71 again. When the air is sent to the condenser 74 by the outdoor air blower 76, heat moves between the refrigerant and the air, and similarly, when the air is sent to the evaporator 77 by the indoor air blower 78, heat is moved between the refrigerant and the air.

The configuration and operation of the refrigerating and air conditioning apparatus 7 described above are examples, and the present invention is not limited to the examples described above.

The refrigerating and air conditioning apparatus 7 according to the third embodiment has the advantages described in the first and second embodiments.

In addition, since the refrigerating and air conditioning apparatus 7 according to the third embodiment includes the compressor 300 according to the second embodiment. Thus, the refrigerating and air conditioning apparatus 7 has high efficiency.

Features of the embodiments and features of the variations described above can be combined as appropriate.

What is claimed is:
1. A rotor comprising:
a rotor core including a first magnet insertion hole, a second magnet insertion hole, and a center lib between the first magnet insertion hole and the second magnet insertion hole;
a first permanent magnet disposed in the first magnet insertion hole, the first permanent magnet being W1 mm long in a longitudinal direction in a plane perpendicular to an axial direction; and
a second permanent magnet disposed in the second magnet insertion hole, the second permanent magnet being W1 mm long in a longitudinal direction in the plane, wherein
the first magnet insertion hole and the second magnet insertion hole are disposed in a V shape so that a center of one pair of the first magnet insertion hole and the second magnet insertion hole projects toward a center of the rotor core in the plane,
the first magnet insertion hole includes
a first magnet disposition part in which the first permanent magnet is disposed,
a first flux barrier part communicating with the first magnet disposition part,
a first outside opening part located on an outer side with respect to the first magnet disposition part in a radial direction of the rotor core, the first outside opening part having a radius of curvature of R1 mm in the plane, and
a first inside opening part located on an inner side with respect to the first magnet disposition part in the radial direction, the first inside opening part having a radius of curvature of R2 mm in the plane, and
the second magnet insertion hole includes
a second magnet disposition part in which the second permanent magnet is disposed,
a second flux barrier part communicating with the second magnet disposition part,
a second outside opening part located on an outer side with respect to the second magnet disposition part in the radial direction, the second outside opening part having a radius of curvature of R1 mm in the plane, and a second inside opening part located on an inner side with respect to the second magnet disposition part in the radial direction, the second inside opening part having a radius of curvature of R2 mm in the plane, and the rotor satisfies R1>R2 and 0<(R1+R2)/W1<0.082.

2. The rotor according to claim 1, wherein the rotor core includes a first outside curved part defining the first outside opening part, a first outside support part supporting the first permanent magnet, a first outside connection part connecting the first outside curved part and the first outside support part, the first outside connection part having a radius of curvature of R3 in the plane, a first inside curved part defining the first inside opening part, a first inside support part supporting the first permanent magnet, a first inside connection part connecting the first inside curved part and the first inside support part, the first inside connection part having a radius of curvature of R4 in the plane, a second outside curved part defining the second outside opening part, a second outside support part supporting the second permanent magnet, a second outside connection part connecting the second outside curved part and the second outside support part, the second outside connection part having a radius of curvature of R3 in the plane, a second inside curved part defining the second inside opening part, a second inside support part supporting the second permanent magnet, and a second inside connection part connecting the second inside curved part and the second inside support part, the second inside connection part having a radius of curvature of R4 in the plane, and the rotor satisfies 0<R3/R4<4.45.

3. The rotor according to claim 2, wherein the rotor satisfies 0<R3/R4<4.

4. The rotor according to claim 1, wherein the rotor satisfies 0<R1/R3<3.

5. The rotor according to claim 1, wherein the rotor satisfies R1>R2 and 0.02<(R1+R2)/W1<0.082.

6. The rotor according to claim 1, wherein the rotor satisfies R1>R2 and 0.02<(R1+R2)/W1<0.06.

7. An electric motor comprising:

a stator; and the rotor according to claim 1, the rotor being disposed inside the stator.

8. A compressor comprising:

a closed container;

a compression device disposed inside the closed container; and the electric motor according to claim 7, to drive the compression device.

9. An air conditioner comprising:

the compressor according to claim 8; and a heat exchanger.

* * * * *